United States Patent [19]

Zatmann

[11] 4,075,148

[45] Feb. 21, 1978

[54] WATER-BASED COATING COMPOSITIONS

[75] Inventor: Jean Zatmann, Neuilly, France

[73] Assignee: PPG Industries, Inc., Pittsburgh, Pa.

[21] Appl. No.: 594,171

[22] Filed: July 8, 1975

[30] Foreign Application Priority Data

July 12, 1974 France .............................. 74 24335
Dec. 10, 1974 France .............................. 74 40526

[51] Int. Cl.$^2$ ............................................. C08L 63/10
[52] U.S. Cl. .......................... 260/23 EP; 260/18 EP; 260/23.7 A; 260/23.7 R; 260/29.7 NR; 260/836; 204/181 R
[58] Field of Search ..................... 260/23.7 A, 23.7 R, 260/23 EP, 18 EP, 29.7 NR, 836; 204/181

[56] References Cited

U.S. PATENT DOCUMENTS

| | | | |
|---|---|---|---|
| 3,518,212 | 6/1970 | Ruecke et al. .................. | 260/18 EP |
| 3,689,446 | 9/1972 | Furuya et al. ................... | 260/23.7 R |
| 3,772,227 | 11/1973 | Kapalko et al. ................. | 260/18 EP |

Primary Examiner—Eugene C. Rzucidlo
Attorney, Agent, or Firm—Carl T. Severini; J. Timothy Keane

[57] ABSTRACT

Coating compositions which are water soluble or dispersible after basic neutralization comprise the reaction product in the proportion by weight of 90:10 to 10:90 of (1) one or more epoxy resins containing 1 to 2 free oxirane groups, which can be partially esterified by fatty acids, with (2) one or more compounds obtained by the reaction of diene polymerizates with alpha,beta unsaturated carboxylic or dicarboxylic acids or anhydrides, in the presence of an alcoholic moderator solvent. The reaction is conducted at a temperature of at least 130° C.

These coating compositions may contain, if desired, other components such as pigments, partial esters and methylol phenol ethers. They can be applied by roller, spraying, dipping, and are especially adapted for application by electrodeposition, to obtain after curing coatings which are both flexible and hard.

20 Claims, No Drawings

WATER-BASED COATING COMPOSITIONS

BACKGROUND OF THE INVENTION

The formation of mixtures of epoxy resin esters and maleinized oils or other maleinized organic derivatives is known. French Patent No. 69 25 181, describes coating products which are water soluble after neutralization, comprising reaction products of diene polymerizates with alpha, beta-unsaturated carboxylic acids or anhydrides and at least one thermoreactive condensation product of formaldehyde and phenol-carboxylic acids, and other optional constituents. Among said optional constituents, ethylene glycol, propylene glycol and other saturated diols are mentioned, as well as are mentioned derivatives of diphenylol propane and epichlorohydrin, said derivatives being esterified by fatty acids, whereby they contain no free oxirane groups. In U.S. Pat. No. 3,518,212, a process is described according to which monoepoxide esters are prepared and the latter are then reacted with a polycarboxylic acid resin comprising the reaction product of an alpha, beta-unsaturated carboxylic diacid or an anhydride of said diacid, coupled with a siccative oil and other diene derivatives.

According to the process described in U.S. Pat. No. 3,518,212, the reaction of the polycarboxylic acid resin with the monoepoxide ester should be effected at a temperature of about 85° C. for a period of time of from 30 minutes to 1 hour, it being specified that temperatures above 120° C. are to be avoided since higher temperatures give rise either to an excessive formation of foam when the reacting products comprise water, or to a side esterification of the —OH groups when the reacting products do not comprise water. Furthermore, it is specified that the ester is produced in the presence of a tertiary amine.

DESCRIPTION OF THE INVENTION

It has now been found that coating compositions which are water-soluble (or water-dispersible) after basic neutralization and having exceptional qualities can be prepared by reacting in a weight ratio of 10:90 to 90:10, (1) one or more epoxy resins containing 1 to 2 free oxirane groups and which are preferably partially esterified by fatty acids, with (2) one or more compounds obtained by the reaction of diene polymerizates, preferably 1,4- or 1,2-polybutadiene, with alpha, beta unsaturated polycarboxylic or carboxylic acids or anhydrides thereof, and preferably maleic anhydride, in the presence of an alcoholic moderator solvent, preferably a glycol such as butylene glycol.

According to the invention, a complete reaction of components (1) and (2) is realized at a temperature higher than 130° C. at a pressure substantially equal to atmospheric pressure.

The reaction is controlled by the presence of an alcoholic solvent, such as a liquid monoalcohol or glycol, for example, and it is continued until the free oxirane groups have completely disappeared.

While not wishing to be tied down by any theory, the applicant believes that a tridimensional network is set up between components (1) and (2) of the composition of the invention; said network consisting, on the one hand, of a polycarboxylic acid and, on the other hand, the epoxy resin having an oxirane group and one or more free secondary hydroxyl groups, said epoxy resin may, moreover, contain up to two oxirane groups which react with the polycarboxylic acid.

The reaction of components (1) and (2) is demonstrated by the fact that the binder composition obtained after the reaction provides coatings which are both harder and more flexible than the coatings obtained from binders made by simple mixing or by heating for 1 hour at 85° C. Hardness and flexibility are, of course, highly desirable properties for coatings but are difficult to achieve in combination; improvement in hardness tends to be at the expense of flexibility and vice versa.

The compositions are made soluble (or dispersible) in water by neutralization of all or part of the acidic groups with a base, in accordance with known procedures. Suitable bases are well known in the art and include alkali metal hydroxides, e.g. KOH, but more preferably amines such as triethylamine, diethylamine, morpholine, ethanolamine and the like.

After conventional neutralization of the products of the invention with suitable bases, a binder is obtained which, used in water-based paints applicable by roller, paint gun or soaking, or by electrodeposition, provides after curing films having exceptional flexibility and hardness wherein the binder has a very close affinity for pigments.

The epoxy resins containing at least one free oxirane group used in the process of the invention are, for example, the products sold under the names of "Epon" and "Epikote" resins. These are epoxy resins derived from the reaction of epichlorohydrin and bisphenol A, having epoxy equivalent weights between about 180 and about 500, for example, certain such resins have epoxy equivalent weights of 190 and 475.

The epoxy resin can be partially esterified by fatty acids, which are selected from the fatty acids known to those with ordinary skill in the art and include notably linseed, dehydrated castor oil, soya and tall oil fatty acids. Such partial esterification is carried out by known processes, by heating at 230° C., for example, without a catalyst, or in the presence of known catalysts such as $Na_2CO_3$, lithium carbonate or stannous octoate.

The diene polymerizates used in the compositions according to the invention are prepared in a known manner from 1,4-butadiene, 2-methyl-1,3-butadiene or isoprene, 2,3-dimethyl 1,3-butadiene, chloroprene and/or another diene, optionally by copolymerization with suitable comonomers such as styrene, alpha-methylstyrene, vinyl acetate, acrylonitrile or the like. Such diene copolymerizates prepared in a conventional manner preferably have a viscosity in the range of 100 to 30,000 centipoises.

According to a particularly advantageous embodiment of the invention, maleic acid or maleic anhydride is reacted with the diene polymerizate.

While the coating compositions described can be applied to virtually any substrate in any known way, they are particularly adapted to be applied to conductive substrates by electrodeposition. Electrodeposition of coatings is well known in the art and the conditions and procedures conventionally utilized with coating compositions of this general type are applicable to the present compositions.

The compositions of the invention can be used in a pigmented or non-pigmented form, by means of any of the usual techniques of application. The pigments employed can be any of those conventionally utilized with water-based coating compositions, including those employed in coatings applied by electrodeposition.

The coatings realized which contain said binder compositions are ordinarily cured by baking at a temperature between 110° and 230° C. and preferably at 180° C., and provide exceptionally flexible cured coatings compared with similar known types of coatings and form a hard, resistant film.

Optional components which can be utilized in the compositions of the invention include, in addition to pigments and other conventional formulating additives (e.g. antioxidants, stabilizers, surfactants, etc.), other resinous materials which provide desired modified properties. It may be advantageous, for example, to include partial esters of certain hydroxyl-containing products; of particular interest are fatty acid esters of resinous polyols such as the commercially available styrene allyl alcohol copolymers (e.g. the product sold as "RJ-101"). The inclusion of such esters often permits lower reaction temperatures to be used in forming the reaction products herein.

It has also been found possible to further improve the compositions of the present invention, particularly insofar as their resistance to chemical agents is concerned, by incorporating in said compositions from 5 to 20 percent by weight of at least one methylol phenol ether. These methylol phenol ethers have the formula:

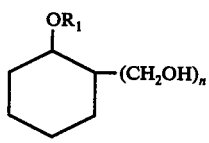

wherein $n$ is an integer of 1 to 3 and where $R_1$ is an unsaturated aliphatic group. In this formula, it is advantageous for the groups represented by $R_1$ to contain at least 3 carbon atoms, and these groups can be, for example, allyl groups or other unsaturated aliphatic groups, such as methallyl, crotyl and butenyl groups, the allyl groups, however, being preferred.

The said methylol phenol ethers used according to the invention are, for example, those described in U.S. Pat. No. 2,579,330 and, as described therein, they can be obtained from sodium or barium salts of 2,4,6-tris(hydroxymethyl) phenols which are obtained by reacting formaldehyde with phenol in the presence of sodium or barium hydroxide. The preferred methylol phenol ether compositions are those available on the market, which generally speaking comprise mixtures of allylic ethers of mono-, di- and trimethylol phenols (substituted in the ortho, meta and para positions), the trimethylol derivative being generally the main component of the composition. One such commercially available composition is sold as "Methylon 75108."

The methylol phenol esters, when employed in the compositions herein, can be added at any time during the preparation of the composition. They are preferably incorporated during the neutralization step.

The invention is described in greater detail in the following examples, which are in no way limitative.

EXAMPLE 1

One hundred forty grams of linseed fatty acids were added to 380 grams of an epichlorohydrin-bisphenol A epoxy resin having an epoxide equivalent weight of 190. The mixture was heated for 4 hours at 200° C. until an acid number of 1 was obtained. An epoxide ester having 1.5 free oxirane group per molecule was thus prepared.

Maleinized polybutadiene with 15 percent maleic anhydride was prepared by conventional means, involving heating 1,4-polybutadiene and maleic anhydride at 200° C. for several hours. One thousand grams of the maleinized polybutadiene were condensed with 200 grams of the epoxide ester in the presence of 120 grams of ethylene glycol. The mixture was heated at 140° C. for 2 hours and sufficient solvent added so that the resinous composition could be manipulated when cold.

The resinous composition thus obtained was solubilized by the addition of water and triethylamine.

Pigments were added, in the conventional manner, and the water-based paint so obtained was applied by spray gun to a substrate to be coated. The coat of paint formed (thickness 22 microns) was dried for 10 minutes at 100° C., then for 30 minutes at 180° C., thus obtaining a very flexible, hard film which was resistant to bad weather.

EXAMPLE 2

Two hundred eighty grams of dehydrated castor oil fatty acids were added to 950 grams of an epichlorohydrin-bisphenol A epoxy resin having an epoxide equivalent weight of 475. Five percent by weight of xylene was added and the mixture was heated to a temperature of 200° C. which was maintained for 4 hours, and then at a temperature of 225° C. which was maintained for 2 hours, to produce an epoxide ester.

Maleinized 1,4-polybutadiene containing 19% maleic anhydride, prepared in the usual way, as described above, (1200 grams) was condensed with 360 grams of the epoxide ester in the presence of 150 grams of butylene glycol. The composition was heated for 3 hours at 130° C. until a viscosity of 400 centipoises was obtained (measured at 50% solids in butylene glycol).

The resinous composition obtained was solubilized with water to which a solubilization amine (e.g. triethylamine) had been added.

Pigments were added and the composition was applied by electrodeposition until a 22 micron film was obtained which, after curing for 20 minutes at 180° C., had a hardness of 200 seconds measured by the Persoz pendulum, and a flexibility of 6mm by the Erichsen apparatus.

For purposes of comparison, a similar resin was prepared, which was modified by heating for 1 hour at 120° C. After application by electrodeposition under the same conditions, values of 130 seconds by the Persoz pendulum and 2 mm by the Erichsen apparatus were respectively obtained, which proves that the coating compositions of the invention provide exceptionally hard, very flexible films and that the two components are effectively combined.

EXAMPLE 3

Two hundred eighty grams of soya fatty acids were added to 950 grams of an epichlorohydrin-bisphenol A epoxy resin having an equivalent weight of epoxide of 475, thus obtaining a compound (1).

Secondly, maleinized polybutadiene comprising 14% maleic anhydride was prepared in the conventional manner, this being compound (2).

Compounds (1) and (2) were condensed in a proportion of 20:80 respectively, by heating at 130° C. for 3 hours in the presence of 10 parts by weight of butylene glycol.

When the reaction had ended, the composition was cooled to 80° C. and 10 parts by weight of the methylol ether allyl phenol (Methylon 75108) were added. It was left to react for 15 minutes and a sufficient amount of an alcoholic solvent was added to render the resinous composition workable when cold.

The composition was solubilized in water to which a solubilization amine had been added, as described above.

Pigments were added and the composition was applied by electrodeposition until a film was obtained which, after curing for 20 minutes at 200° C., was found to possess excellent resistance to chemical agents such as alkaline lyes.

EXAMPLE 4

The procedure of Example 3 was followed, using 380 grams of an epoxy resin having an epoxide equivalent weight of 190 condensed with 3800 grams of a maleinized 1,4-polybutadiene comprising 19% maleic anhydride. The composition was heated for 4 hours at 130° C. in the presence of 400 grams of butylene glycol. Similar results to those of Example 3 were obtained.

EXAMPLE 5

This example is given for purposes of comparison in order to demonstrate the influence of temperature reaction conditions for the production of the resins.

A mixture of 2030 grams of 19% maleinized polybutadiene with 206 grams of epoxide monoester obtained by the reaction of dehydrated castor oil fatty acids with an epichlorohydrin-bisphenol A epoxy resin (epoxide equivalent 475—"Epikote 1001") was reacted for 4 hours at 110° C. in the presence of 130 grams of butylene glycol to obtain Resin A. The same mixture was heated for 4 hours at 130° C. to obtain Resin B.

The two resins were solubilized separately by the usual method and the same pigment paste was added to each. After coating and curing as in Example 2 coatings of 20 microns thickness were obtained, having the following characteristics:

|  | Hardness Persoz | Erichsen | Impact |
| --- | --- | --- | --- |
| Resin A (comparison) | 140 seconds | 5.5 mm | 15 kg × cm |
| Resin B (according to the invention) | 170 seconds | 4.8 mm | 30 kg × cm |
| Non-modified resin | 130 seconds | 4 mm | 10 kg × cm |

Resin B was obtained under the conditions according to this invention. The above table shows that improved characteristics are obtained owing to the reaction occurring between the maleinized polybutadiene and the epoxide derivative when the reaction temperature is at least 130° C.

EXAMPLE 6

Thirty parts by weight of the resinous composition obtained in accordance with Example 2 were mixed with 3 parts by weight of mixed allyl ethers of mono-, di- and trimethylol phenol (Methylon 75108), along with 4 parts by weight of isopropanol. There were also added 0.27 part by weight of triethylamine and 0.65 part by weight of monoethanolamine.

The composition was stirred for 10 minutes and diluted with 62.08 parts water.

Pigments were added and the composition was applied by electrodeposition until a 22 micron film was obtained which, after curing for 20 minutes at 180° C. had a hardness index of 200 inches measured by the Persoz pendulum and an impact resistance of 35 kg-cm.

EXAMPLE 7

One hundred forty grams of linseed fatty acids were added to 380 grams of an epichlorohydrin-bisphenol A epoxy resin having an epoxide equivalent of 190. The mixture was heated for 4 hours at 200° C. until an acid number of 1 was obtained. An ester having 1.5 free oxirane group per molecule was thus prepared.

Maleinized 1,4-polybutadiene comprising 15 percent maleic anhydride was prepared in the conventional way, and 1000 grams of the maleinized polybutadiene were condensed with 200 grams of the epoxide ester in the presence of 120 grams of ethylene glycol. The composition was heated at 140° C. for 2 hours.

This resinous composition (30 parts by weight) was then mixed with 3 parts by weight of methylol phenol ethers (Methylon 75108) and 4 parts by weight of isopropanol. There were also added 0.27 part by weight of triethylamine and 0.65 part by weight of monoethanolamine and the composition was stirred for about 10 minutes and diluted with 62.08 parts of water.

The usual pigments were added to said composition and the water-based paint so obtained was applied with a spray gun to a substrate to be coated. The coat of paint obtained was about 22 microns thick. It was dried for 10 minutes at 100° C. then for 30 minutes at 180° C., thus obtaining a hard film, having great flexibility and very resistant to chemical agents and bad weather. This film had an impact strength of about 35 kg/cm.

According to the provisions of the patent statutes, there is described above the invention and what are now considered to be its best embodiments. However, within the scope of the appended claims, it is to be understood that the invention can be practiced otherwise than is specifically described.

I claim:

1. A process for obtaining coating compositions containing the reaction product of epoxy resins having free oxirane functional groups and of diene polymers modified by carboxylic acids or anhydrides, said compositions being water-soluble after neutralization with a base, which comprises reacting until said free oxirane functional groups have reacted:
   (1) at least one epoxy resin containing 1 to 2 free oxirane groups, with
   (2) at least one compound obtained by the reaction of a diene polymerizate with an alpha, beta-unsaturated carboxylic or dicarboxylic acid or anhydride, in the presence of a liquid alcohol moderator solvent at a temperature of at least about 130° C., said liquid alcohol moderator solvent remaining in a liquid state at said reaction temperature during reaction of said free oxirane groups.

2. A process according to claim 1 wherein the reaction is carried out at a temperature in the range of 130° to 230° C. until the free oxirane groups initially present have completely disappeared.

3. The process according to claim 1 wherein said epoxy resin is partially esterified with fatty acids.

4. A process according to claim 1 wherein component (2) is the reaction product of 1,4- or 1,2-polybutadiene with maleic anhydride.

5. A process according to claim 1 wherein the alcoholic moderator solvent is a glycol.

6. The process according to claim 1 wherein components (1) and (2) are in a weight ratio of 90:10 to 10:90.

7. A water-soluble coating composition essentially free of unreacted oxirane functional groups comprising the base-neutralized reaction product of
(1) at least one epoxy resin containing 1 to 2 free oxirane groups with
(2) at least one compound obtained by the reaction of a diene polymerizate with an alpha, beta-unsaturated carboxylic or dicarboxylic acid or anhydride, said reaction product being formed in the presence of a liquid alcoholic moderator solvent and at a temperature of at least about 130° C., with said liquid alcohol moderator solvent remaining in a liquid state at said reaction temperature during reaction of said free oxirane groups.

8. The composition according to claim 7, wherein the reaction is carried out at a temperature in the range of 130° to 230° C. until the free oxirane groups initially present have completely disappeared.

9. The composition according to claim 7 wherein said epoxy resin is partially esterified with fatty acids.

10. A composition according to claim 7 wherein component (2) is the reaction product of 1,4- or 1,2-polybutadiene with maleic anhydride.

11. A composition according to claim 7 wherein the alcoholic moderator solvent is a glycol.

12. The composition according to claim 7 wherein components (1) and (2) are in a weight ratio of 90:10 to 10:90.

13. A water-soluble composition essentially free of unreacted oxirane functional groups comprising
(A) the base-neutralized reaction product of
(1) one or more epoxy resins containing 1 to 2 free oxirane groups, with
(2) one or more compounds obtained by the reaction of a diene polymerizate with an alpha, beta-unsaturated carboxylic or dicarboxylic acid or anhydride said reaction product being formed in the presence of a liquid alcoholic moderator solvent, said liquid alcoholic moderator solvent remaining in a liquid state at said reaction temperature during reaction of said free oxirane groups, and
(B) from 5 to 20 parts by weight, for 100 parts by weight of (A), of at least one methylol phenol ether.

14. The composition according to claim 13 wherein the reaction is carried out at a temperature in the range of 130° C. to 230° C. until the oxirane groups initially present have completely disappeared.

15. The composition according to claim 13 wherein component (2) is the reaction product of 1,4- or 1,2-polybutadiene with maleic anhydride.

16. The composition according to claim 13 wherein the methylol phenol ether has the formula

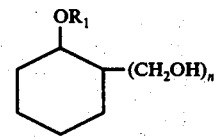

wherein $n$ is an integer of 1 to 3 and wherein $R_1$ is an unsaturated aliphatic group.

17. The composition according to claim 16 wherein $R_1$ is an allyl, methallyl, crotyl or butenyl group.

18. The composition according to claim 16 wherein components (1) and (2) are in a weight ratio of 90:10 to 10:90.

19. The method of applying a coating to a conductive substrate which comprises electrodepositing the water-based coating composition of claim 7.

20. The method of applying a coating to a conductive substrate which comprises electrodepositing the water-based coating composition of claim 13.

* * * * *